US012665897B1

(12) United States Patent
Nair et al.

(10) Patent No.: US 12,665,897 B1
(45) Date of Patent: *Jun. 23, 2026

(54) OBJECT AUTHENTICATION

(71) Applicant: CITIGROUP TECHNOLOGY, INC., Weehawken, NJ (US)

(72) Inventors: Sandeep Nair, Odessa, FL (US); Matthew E. Nunn, Frisco, TX (US); Julio Caraballo, Woodcliff Lake, NJ (US); Jason Edward Morris, London (GB); Udaya Chandupatia, Frisco, TX (US); Partha S. Peddi, Riverview, FL (US)

(73) Assignee: CITIGROUP TECHNOLOGY, INC., Weehawken, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/615,595

(22) Filed: Mar. 25, 2024

Related U.S. Application Data

(63) Continuation of application No. 17/334,186, filed on May 28, 2021, now Pat. No. 11,943,215.

(51) Int. Cl.
| | |
|---|---|
| *G06F 21/57* | (2013.01) |
| *G06F 8/65* | (2018.01) |
| *H04L 9/32* | (2006.01) |
| *H04L 9/40* | (2022.01) |

(52) U.S. Cl.
CPC .............. *H04L 63/083* (2013.01); *G06F 8/65* (2013.01); *H04L 9/3226* (2013.01); *H04L 9/3268* (2013.01); *H04L 63/0823* (2013.01); *H04L 63/0869* (2013.01)

(58) Field of Classification Search
None
See application file for complete search history.

(56) References Cited

U.S. PATENT DOCUMENTS

| | | | | |
|---|---|---|---|---|
| 2016/0359629 | A1* | 12/2016 | Nadathur | ................. H04L 9/14 |
| 2018/0007059 | A1* | 1/2018 | Innes | ................. G06F 21/6218 |
| 2019/0044940 | A1* | 2/2019 | Khalil | ................. H04L 9/3247 |
| 2022/0116220 | A1* | 4/2022 | Weinstock | ............ H04L 9/3226 |
| 2022/0150066 | A1* | 5/2022 | Sugarev | ................. H04L 9/3247 |
| 2022/0255931 | A1* | 8/2022 | Avetisov | ................. H04L 9/3247 |
| 2022/0286446 | A1* | 9/2022 | Hecht | ................. H04L 63/101 |

OTHER PUBLICATIONS

Office Action for U.S. Appl. No. 17/334,186, Jun. 23, 2023, 15 pages.

* cited by examiner

*Primary Examiner* — Nelson S. Giddins
(74) *Attorney, Agent, or Firm* — Perkins Coie LLP

(57) ABSTRACT

Machines, devices, and other objects are configured to use authorization tokens to verify object identities without human input. In examples, the object uses a password to validate the object's identity to an authorization server to obtain an access token for use in multiple applications. In another example, the object uses a certificate to validate the object's identity to an authorization server to obtain an access token. In other examples, any other suitable identifying data may be used to validate the object's identity to an authorization server to obtain an access token. The process of using passwords, certificates, or other validation processes to obtain tokens or other authorization mechanisms allows the object to authenticate themselves without human interaction and to use a single identity to access services from multiple service providers that trust a central authorization server.

20 Claims, 4 Drawing Sheets

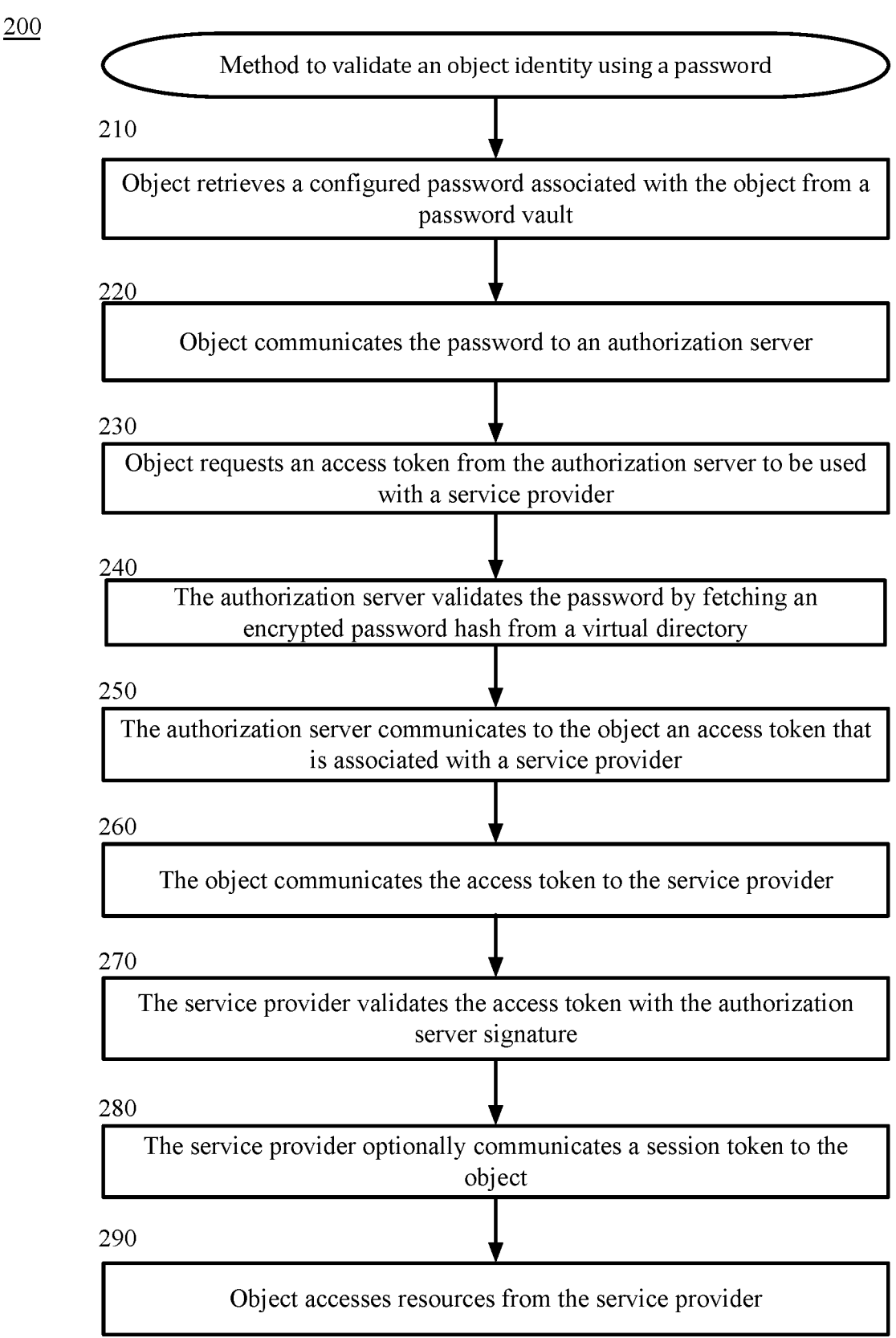

200

Method to validate an object identity using a password

210

Object retrieves a configured password associated with the object from a password vault

220

Object communicates the password to an authorization server

230

Object requests an access token from the authorization server to be used with a service provider

240

The authorization server validates the password by fetching an encrypted password hash from a virtual directory

250

The authorization server communicates to the object an access token that is associated with a service provider

260

The object communicates the access token to the service provider

270

The service provider validates the access token with the authorization server signature

280

The service provider optionally communicates a session token to the object

290

Object accesses resources from the service provider

OBJECT AUTHENTICATION

CROSS REFERENCE TO RELATED APPLICATIONS

This application claims the benefit of priority to and is a continuation of co-pending U.S. patent application Ser. No. 17/334,186 filed May 28, 2021, entitled "Object Authentication", the entire contents of which are hereby expressly incorporated herein by this reference including, without limitation, the specification, claims, and abstract, as well as any figures, tables, or drawings thereof.

FIELD OF THE INVENTION

The present invention relates generally to the field of machine (object) to machine (object) authentication, and more particularly to methods and systems to allow a network of machines, computing devices, services, or other objects to use authorization tokens issued by a trusted central authorization server to verify object identities without human input.

BACKGROUND OF THE INVENTION

Applications that utilize online, cloud-based, and networked access for users and customers employ policies to limit access to the applications and communications between users. Users must authenticate themselves to access applications such as email or financial transaction applications. Users often are required to use passwords to access group applications, such as online data services, video calls, or social network applications.

To reduce the need for human users to remember multiple identifications and passwords to access multiple applications, systems were created to allow users to use single sign-on systems. These systems allow users to access multiple applications with a single credential or password. Different systems were created to validate users or store authentications for users, such as OAuth, Infrastructure as a Service, Vaulting, Container Orchestrators, and other suitable systems.

Despite the growing number of options for users to authenticate themselves, objects or other non-human machines rely on point to point communications to authenticate themselves to other objects in conventional technologies. The authentication systems between objects are distributed and decentralized. An object is not able to use a single credential to access services from multiple service providers.

There is a present need for a solution that resolves all of the foregoing issues and provides, for example, improved methods and systems to allow a network of machines, services, or other objects to use authorization tokens to verify object identities without human input.

SUMMARY OF THE INVENTION

Embodiments of the invention employ computer hardware and software, including, without limitation, one or more processors coupled to memory and non-transitory computer-readable storage media with one or more executable programs stored thereon that instruct the processors to perform the methods and processes described herein. Such embodiments are directed to technological solutions that may involve systems that include, for example, at least one processor coupled to memory and programmed to enable a network of machines, services, or other objects to use authorization tokens to verify object identities without human input.

In certain examples, an object uses a password to validate the object's identity to an authorization server to obtain an access token for use in multiple applications. In another example, the object uses a certificate to validate the object's identity to an authorization server to obtain an access token. In other examples, any other suitable identifying data may be used to validate the object's identity to an authorization server to obtain an access token. The process of using passwords, certificates, or other validation processes to obtain tokens or other authorization mechanisms allows the object to authenticate themselves without human interaction and to use a single credential to access services from multiple service providers.

In an example, a processor of a system associated with a non-human machine or system retrieves a password associated with the processor, such as from a password vault. The processor communicates the password to an authorization server. Upon verification, the processor receives an access token from the authorization server and communicates the access token to a service provider device and a request for data from the service provider device. The processor is then allowed to receive requested data from the service provider device upon a validation of the access token. The processor is able to use the received data to update the object's software, provide data to a user or other system, update a communication network, or perform any other suitable task using the data.

In certain examples of the method described herein, the authorization server validates the password by fetching an encrypted password for the processor from a virtual directory. The processor may request a password for the system from a password vault system. The processor may receive a session token from the service provider device. The service provider device may communicate a session token to the processor upon receipt of the access token.

In an example, a processor of a system associated with a non-human machine or system accesses a certificate associated with the processor and communicates the certificate to an authorization server. The processor receives an access token from the authorization server and communicates the access token to a service provider device and a request for data from the service provider device. The processor is then allowed to receive the requested data from the service provider device upon a validation of the access token. The processor is able to use the received data to update the object's software, provide data to a user or other system, update a communication network, or perform any other suitable task using the data.

In certain examples of the method described herein, the authorization server validates a subject domain name received from the computing device and the issuer domain name of the certificate to establish an identity via a virtual directory. The processor may negotiate a mutual security protocol with the authorization server. The processor may receive a session token from the service provider device. The service provider device may communicate a session token to the processor upon receipt of the access token.

Other aspects include computer program products that perform the methods and actions described herein.

The technology described herein allows objects, such as non-human machines, applications, computing devices, appliances, network devices, or other suitable objects to use a single credential to access services from multiple service providers. Humans have enjoyed the benefits of systems that allow users to use single sign-on systems that allowed users to access multiple applications with a single credential or password. Objects in conventional systems are limited to point to point authentication. For example, the object must be verified from a user-entered password. The technology described herein allows objects, without the direction of a human, to use single credentials for multiple applications. Passwords from a password vault or certificates from a certificate authority allow the object to be validated and authorized by an authorization server without the need to obtain a password or other credential from a human user. The credential may be created by a computing device or other system without a human being involved or ever seeing the credential.

This process allows for a system to be standardized to allow objects to access many services or data sources without the need for point to point verification. The security of such communications will be enhanced because humans will not create or view the credentials. Increasing automation of objects will be enhanced by the methods and systems herein because objects will be able to exchange data more simply, securely, and without needing customized, tailored, individual solutions. Using the methods and systems described herein will provide an infrastructure for data exchange that makes objects and other computing devices operate more efficiently and securely. For example, when a device seeks to update the device software, the device does not need to wait for a human, provide a human-created password, or wait for a customized point to point connection to the service provider. Instead, the object can use the methods and systems herein to authenticate itself and receive the data securely and quickly.

These and other aspects of the invention will be set forth in part in the description that follows and in part will become more apparent to those skilled in the art upon examination of the following or may be learned from practice of the invention. All such aspects are to be included within this description, are to be within the scope of the present invention, and are to be protected by the accompanying claims.

BRIEF DESCRIPTION OF THE DRAWINGS

FIG. 2 is a block flow diagram depicting a method to validate object identities using a password.

DETAILED DESCRIPTION

Example System Architecture

In example architectures for the technology, while each server, system, and device shown in the architecture is represented by one instance of the server, system, or device, multiple instances of each can be used. Further, while certain aspects of operation of the technology are presented in examples related to the figures to facilitate enablement of the claimed invention, additional features of the technology, also facilitating enablement of the claimed invention, are disclosed elsewhere herein.

Figure 1:
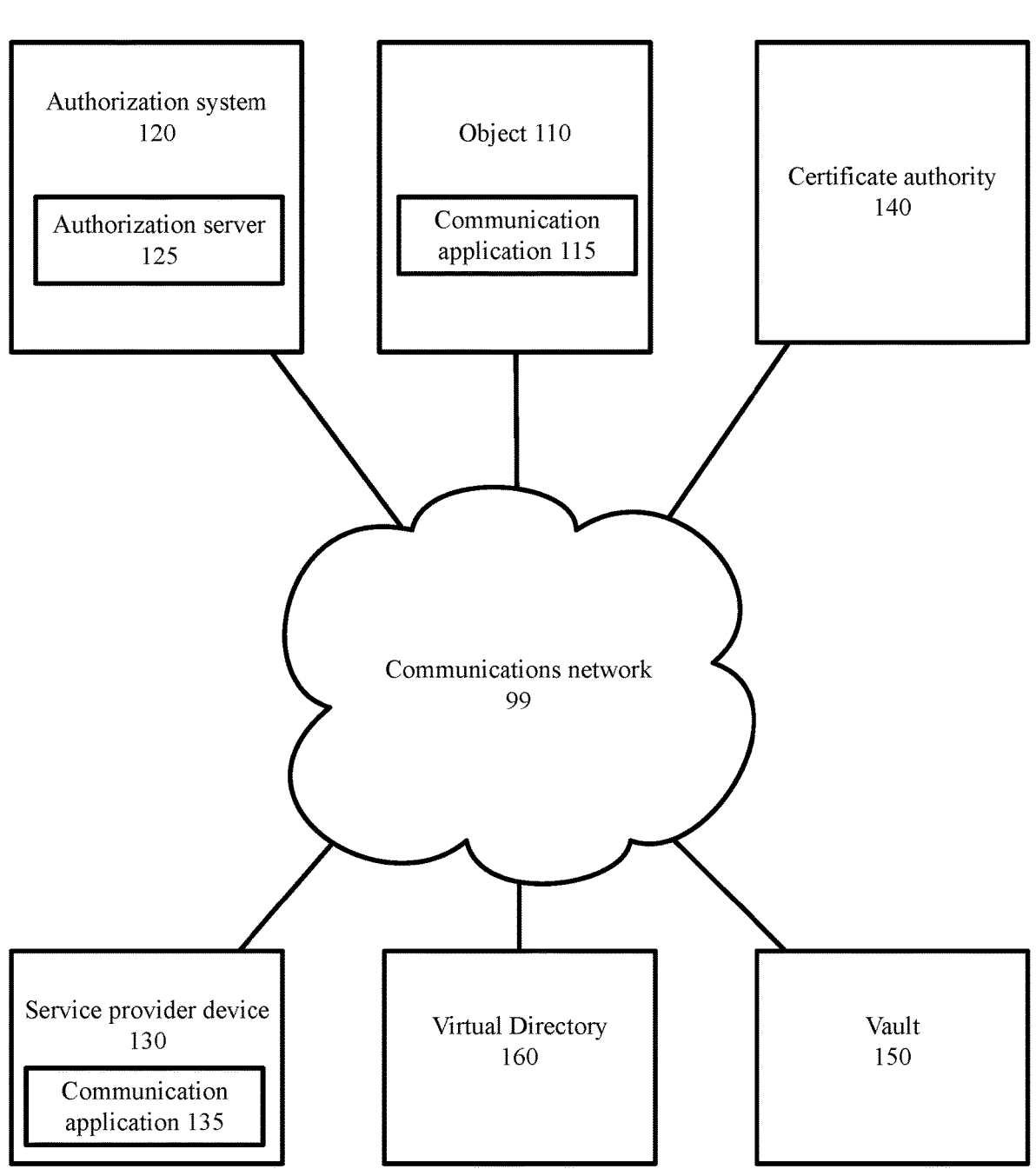
FIG. 1 is a block diagram depicting a system to validate object identities.

FIG. 1 is a block diagram depicting a system to validate object identities, in accordance with certain examples. As depicted in FIG. 1, the architecture 100 includes an authorization system 120, one or more objects 110, a service provider device 130, a certificate authority 140, a vault 150, and a virtual directory 160 connected by communications network 99.

Each network, such as communication network 99, includes a wired or wireless telecommunication mechanism and/or protocol by which the components depicted in FIG. 1 can exchange data. For example, each network 99 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, Wi-Fi, or any combination thereof or any other appropriate architecture or system that facilitates the communication of signals or data. Throughout the discussion of example embodiments, it should be understood that the terms "data" and "information" are used interchangeably herein to refer to text, images, audio, video, or any other form of information that can exist in a computer-based environment. The communication technology utilized by the components depicted in FIG. 1 may be similar to network technology used by network 99 or an alternative communication technology.

Each component depicted in FIG. 1 includes a computing device having a communication application capable of transmitting and receiving data over the network 99 or a similar network. For example, each can include a server, desktop computer, laptop computer, tablet computer, a television with one or more processors embedded therein and/or coupled thereto, smart phone, handheld or wearable computer, personal digital assistant ("PDA"), other wearable device such as a smart watch or glasses, wireless system access point, or any other processor-driven device.

In the example embodiment depicted in FIG. 1, the object 110 is a stand-alone device without an operator to perform the functions herein, the authorization system 120 is operated by an authorization system operator, the service provider device 130 is operated by a service provider operator or other user, a certificate authority 140 is operated by a certificate authority operator, an vault 150 is operated by a vault system operator, and a virtual directory 160 is operated by a virtual directory operator.

As shown in FIG. 1, the object 110 includes a data storage unit (not shown) accessible by a communication application 115. The object 110 may be any type of non-human object operating on a computerized operating system or processor, such as a machine, an application, a service, a computing device, a network device or any other type of object that communicates with service provider devices 130 or other devices. In an example, the object 110 is an appliance, such as a washing machine or a refrigerator. In another example, the object 110 is an application on a user device, such as a stock trading and reporting application on a smart phone. In another example, the object 110 is a server or other computing device that performs tasks for users. Any other type of non-human object 110 may perform the methods herein.

The communication application 115 on the object 110 may be, for example, a web browser application or a stand-alone application, to view, download, upload, or otherwise access instructions, updates, databases, documents, or web pages via the networks 99. The communication application 115 can interact with web servers or other computing devices connected to the network 99, such as the vault 150, the certificate authority 140, the authorization system 120, or any of the systems described herein.

In some embodiments, the user associated with an object 110 can install an application and/or make a feature selection to obtain the benefits of the techniques described herein.

As shown in FIG. 1, the authorization system 120 includes a server 125. The server 125 or one or more other suitable devices are used to perform the computing functions of the authorization system 120. The authorization system 120 and/or the server 125 represent any computing system that may be used to receive passwords or certificates, verify object identities, generate and provide access tokens, fetch password hashes, negotiate mutual transport layer security protocol with the object 110, or perform any other suitable tasks for validating object identities. Any other computing or storage function required by the authorization system 120 may be performed by the server 125. The server 125 may represent any number of servers, cloud computing devices, or other types of device for performing the tasks described herein. In an example, the authorization system 120 is an OAuth server system that provides OAuth tokens. In another example, the authorization system 120 is any other type of authorization process that provides access tokens to objects 110 or users.

As shown in FIG. 1, the service provider device 130 includes a data storage unit (not shown) accessible by a communication application 135. The communication application 135 on the service provider device 130 may be, for example, a web browser application or a stand-alone application, to view, download, upload, or otherwise access instructions, updates, databases, documents or web pages via the networks 99. The communication application 135 can interact with web servers or other computing devices connected to the network 99, such as the vault 150, the certificate authority 140, the authorization system 120, or any of the systems described herein. The service provider device 130 may be any type of non-human object, such as a machine, an application, a service, a computing device, or any other type of object that communicates with objects 110 or other devices. In an example, the service provider device 130 is a database management system. In another example, the service provider device 130 is an application on a server, such as a stock trading and reporting application. In another example, the service provider device 130 is a server or other computing device that performs tasks for users. In another example, the service provider device 130 is a device that provides updates for appliances or other devices. Any other type of non-human service provider device 130 may perform the methods herein.

As shown in FIG. 1, the certificate authority 140 may be, for example, a computing device, a server, a web browser application, or a stand-alone application, to provide certificates to objects 110 or other computing devices. The certificate authority 140 can interact with web servers or other computing devices connected to the network 99. The certificate authority 140 may be an application or a device associated with the authorization system 120, a financial institution, a third party identity verification system, a mobile device service provider, or any other suitable system. In an example, the certificate authority 140 provides certificates to objects 110 and other computing devices. The certificate authority 140 issues digital certificates that certifies the ownership of a public key in the name of the object 110. The public key allows the service provider device 130 to rely upon assertions made about a private key that corresponds to the certified public key.

The vault 150 is a secure online platform where objects 110 and other users collect and maintain digital assets, passwords, and logins. The vault 150 allows the object 110 to share access with trusted systems and devices, such as the authentication system 120. The vault 150 may create, store, and dispense passwords to the object 110 without human interaction or configuration, limiting the opportunity for a malicious actor to gain access to the password.

The virtual directory 160 is a device or application that delivers a single access point for identity management applications and service platforms. The virtual director 160 receives queries from the authorization system 120 or others and directs the query to the appropriate data sources by abstracting and virtualizing data. The virtual directory 160 integrates identity data from multiple heterogeneous data stores and presents the data as though it were coming from virtual directory 160. In the examples, the virtual directory 160 validates the credential by fetching the encrypted client password hash from a system for accessing and maintaining distributed directory information services over an IP network.

Figure 4:
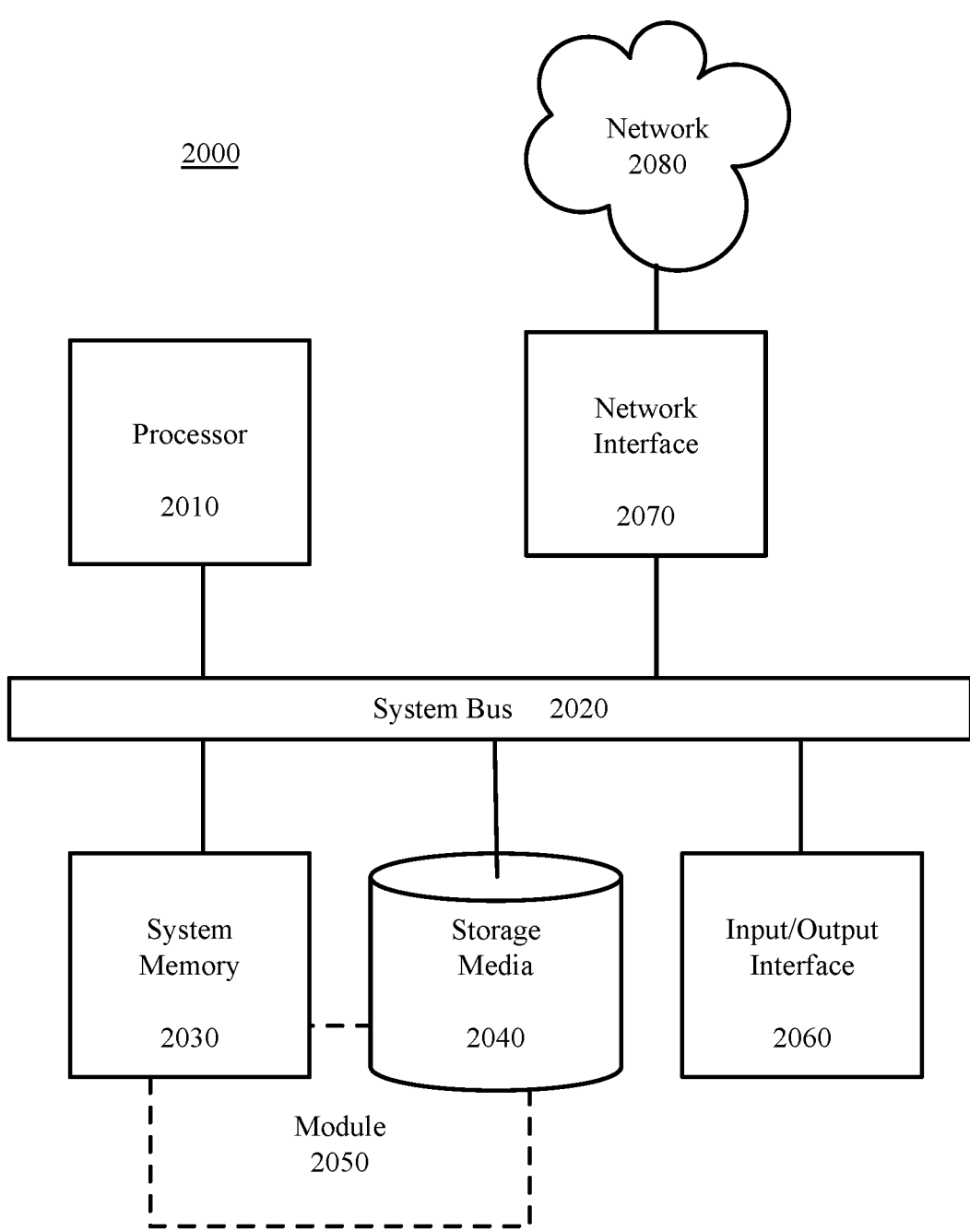
FIG. 4 depicts a computing machine and a module.

In example embodiments, the network computing devices and any other computing machines associated with the technology presented herein may be any type of computing machine such as, but not limited to, those discussed in more detail with respect to FIG. 4. Furthermore, any functions, applications, or components associated with any of these computing machines, such as those described herein or any other others (for example, scripts, web content, software, firmware, hardware, or modules) associated with the technology presented herein may by any of the components discussed in more detail with respect to FIG. 4. The computing machines discussed herein may communicate with one another, as well as with other computing machines or communication systems over one or more networks, such as network 99. The network 99 may include any type of data or communications network, including any of the network technology discussed with respect to FIG. 4.

Example Embodiments

Reference will now be made in detail to embodiments of the invention, one or more examples of which are illustrated in the accompanying drawings. Each example is provided by way of explanation of the invention, not as a limitation of the invention. Those skilled in the art will recognize that various modifications and variations can be made in the present invention without departing from the scope or spirit of the invention. For example, features illustrated or described as part of one embodiment can be used in another embodiment to yield a still further embodiment. Thus, the present invention covers such modifications and variations that come within the scope of the invention.

The technology for embodiments of the invention may employ methods and systems to allow a network of machines, services, or other objects to use authorization tokens to verify object identities without human input. The examples for embodiments of the invention may employ computer hardware and software, including, without limitation, one or more processors coupled to memory and non-transitory computer-readable storage media with one or more executable computer application programs stored thereon, which instruct the processors to perform such methods.

Figure 3:
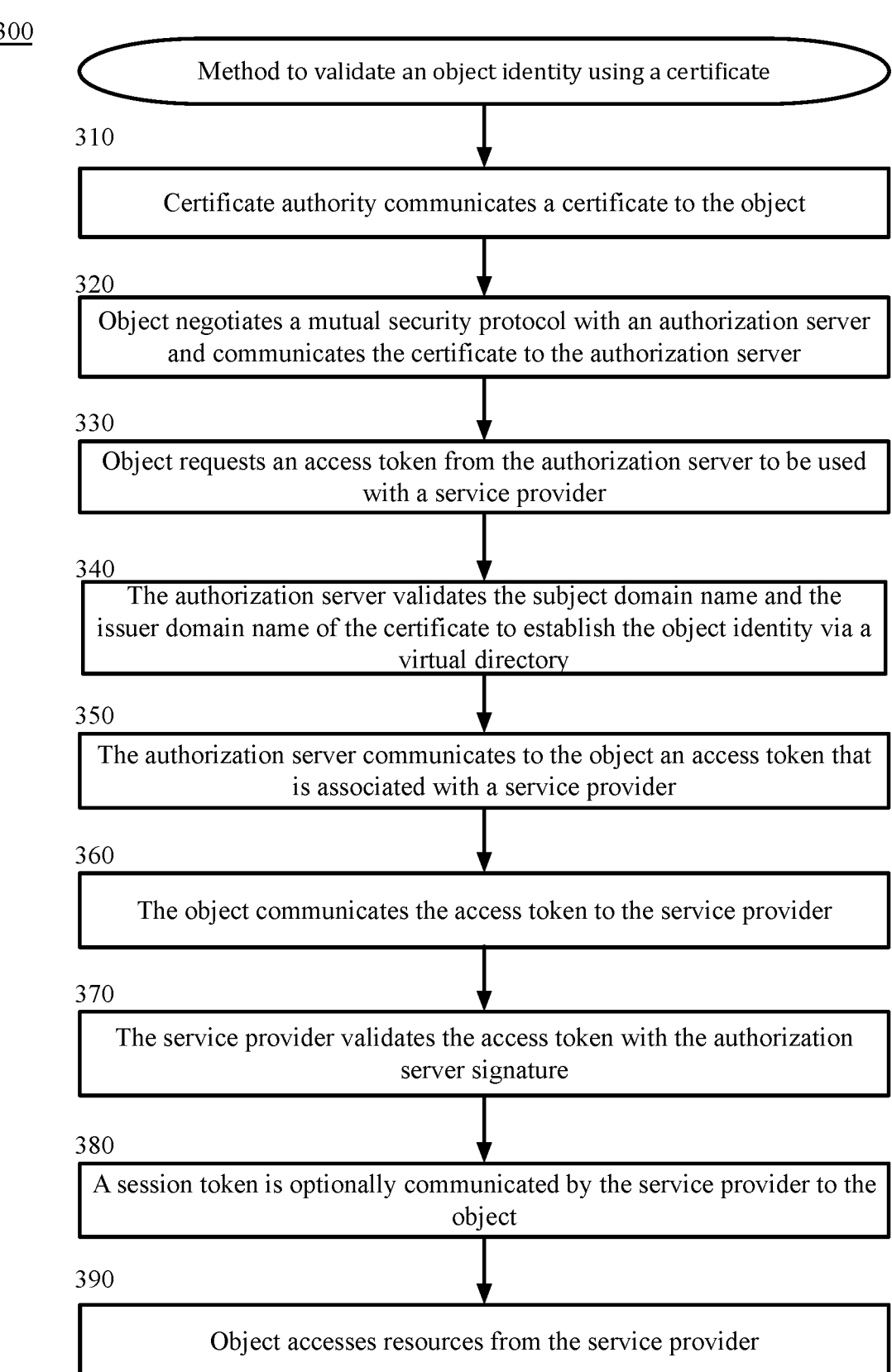
FIG. 3 is a block flow diagram depicting a method to validate object identities using a certificate.

The example methods illustrated in FIGS. 2-3 are described hereinafter with respect to the components of the example communications and processing architecture 100.

FIG. 2 is a block flow diagram depicting a method 200 to validate object identities using a password, in accordance with certain examples.

In block 210, an object 110 retrieves a configured password associated with the object from a password vault 150. The object 110 may be any type of non-human object, such as a machine, an application, a service, a computing device, or any other type of object that communicates with service provider devices 130 or other devices.

In an example, the object 110 is an appliance, such as a washing machine or a refrigerator. The object 110 may be configured to require periodic updates to the software operating the object 110. The object 110 is programmed to communicate with a service provider device 130 to download the update. In conventional systems, the object 110 and the service provider device 130 communicate via a point to point protocol or require a human created and entered password to verify the identity of the object 110. This communication is insecure and does not provide a single password or credential to access any other needed systems.

In another example, the object 110 is an application on a user computing device, such as a stock trading and reporting application, a social media application, a gaming application, or any other suitable application. In the example, the object 110 is configured to communicate with a service provider device 130 that provides data, such as stock quote information, to display to a user of the computing device on which the object 110 operates. The object 110 desires to communicate directly with the service provider device 130 securely without human interaction to obtain data, such as to monitor a stock price. In conventional systems, the object 110 may require a user to provide a password to the service provider device 130 to allow the object 110 to obtain information.

In another example, the object 110 is a server or other computing device that performs tasks for users without human interaction. In another example, the object 110 is a network device that receives and transmits communications to and from other network devices, such as in a cellular network or a data communications network. In another example, the object 110 is a passenger vehicle or an industrial vehicle that receives updates and communications from a central server or from a cloud computing device regarding traffic or operational instructions. In another example, the object 110 is a personal technology device, such as smartphone, smart watch, tablet, headphones, or any other technology device that receives updates and communications from a central server or from a cloud computing device. Any other type of non-human object 110 may perform the methods herein.

The object 110 may be configured to request a communication with another device, such as the service provider device 130. The communication may request or provide data, an update, a check-in, a location update, a status, or any other suitable communication. The communication may be initiated by the object 110, the service provider device 130, a user, or any other suitable party. For example, a service provider device 130 may have received a software update for distribution to a group of appliances operating a certain operating system. The service provider device 130 provides a communication to the group of appliances requesting a secure communication.

When the object 110 determines that a secure communication with the service provider device 130 is needed or imminent, the object 110 identifies a need for a password for identification and authorization. The object 110 communicates a request to a vault 150. The vault 150 is a is a secure online platform in which objects 110 and other users collect and maintain digital assets, passwords, and logins. The vault 150 may create, store, and dispense passwords to the object

110 without human interaction or configuration, limiting the opportunity for a malicious actor to gain access to the password.

In an example, the object 110 communicates a request to vault 150 for a current password for the object 110. The object 110 provides a username for the object 110 with which the password is associated. For example, the username for the object 110 is "object1." The vault 150 accesses a database of passwords and selects the password associated with the username of the object 110. The vault 150 communicates the password to the object 110. The communication may be via any suitable technology, such as an Internet communication over the communications network 99. In certain examples, the communication is encrypted or otherwise protected from outside observation.

In block 220, the object 110 communicates the password to an authorization server 125 of the authorization system 120. The communication may be via any suitable technology, such as an Internet communication over the communications network 99. In certain examples, the communication is encrypted or otherwise protected from outside observation. The object 110 communicates the password with a request to receive in return an access token. The communication may include the username, password, and the service provider device 130 with which the object 110 is attempting communication. For example, the object 110 provides a username and password and details of a potential communication session with a particular service provider device 130.

In block 230, the object 110 requests an access token from the authorization server 125 to be used with a service provider device 130. The communication in the example requests that the authorization system 120 creates or provides an access token that is specific to the particular service provider device 130. An access token may be requested that only is effective with the particular service provider device 130 and not any other provider device.

In block 240, the authorization server 125 validates the password by fetching the encrypted password hash from a virtual directory 160. The virtual directory 160 is a device or application that delivers a single access point for identity management applications and service platforms. The virtual director 160 receives queries from the authorization system 120 or others and directs the query to the appropriate data sources by abstracting and virtualizing data. The virtual directory 160 integrates identity data from multiple heterogeneous data stores and presents the data as though it were coming from virtual directory 160. In the examples, the virtual directory 160 validates the credential by fetching the encrypted client password hash from a system for accessing and maintaining distributed directory information services over an IP network.

In the example, if the password provided by the object 110 matches the password provided by the virtual directory 160, then the object identification is validated and authorized.

In block 250, the authorization server 125 communicates to the object 110 an access token that is associated with a service provider device 130. The authorization server 125 creates or accesses an access token. The access token is associated with the service provider device 130 such that the access token is scoped for the object 110. The authorization server 125 passes the access token as a credential to the object 110 to be provided to the service provider device 130. The passed token informs the service provider device 130 that the bearer of the token has been authorized to access the service provider device 130 and perform specific actions specified by the scope that was granted during authorization.

The configured scope defines the specific functions and protected resources that the service provider device 130 is allowed to share with the object 110. The authorization server 125 scopes the token such that only the required information that is needed is provided to or from the object 110. The authorization server 125 signs the access token with an authorization provider signature to validate the access token to a service provider device 130. The authorization provider signature may be compared by the service provider device 130 to a stored authorization provider signature to verify the authenticity of the access token.

In block 260, the object 110 communicates the access token to the service provider device 130. The communication may be via any suitable technology, such as an Internet communication over the communications network 99. The object 110 provides the scoped access token and a request to provide access to the needed resources. For example, the request may be for a device update, data from a database, access to an application, access to a device, access to a directory, third party information, a communication with a third party, a download, or any other suitable access request. The access token is scoped to allow access to the requested resources, identify the object 110, identify the service provider device 130, or perform any other suitable tasks to support the resource request.

In block 270, the service provider device 130 validates the access token with the authorization server 125 signature. The service provider device 130, after receiving the access token and the request verifies that the authorization provider signature associated with the access token is valid. The authorization provider signature may be compared by the service provider device 130 to a stored authorization provider signature to verify the authenticity of the access token. If the authorization provider signature is verified, then the service provider device 130 determines that the access token is authentic, and access may be granted to the object 110.

In block 280, the service provider device 130 optionally communicates a session token to the object 110. Depending on the implementation of the service provider device 130, a session token may be communicated to the object 110 to identify the session and allow the service provider device 130 to access the session and all user information available for the session. The session token, also known as a sessionID, is an encrypted, unique string that identifies the specific session instance. The session token may be provided in a cookie or in any other suitable communication.

In block 290, the object 110 accesses resources from the service provider device 130. The object 110 requests the needed information or data from the service provider device 130. If the session token, access token, or other instructions provide authorization for the service provider device 130 to allow access to the requested data, then the service provider device 130 communicates the data to the object 110. For example, if the object 110 is an appliance that requires a software update, the object 110 and the service provider device 130 will negotiate to identify the correct version of the software update needed. The service provider device 130 verifies that the authority to provide the software update is provided. The service provider device 130 communicates the software update to the object 110. In another example, the service provider device 130 communicates a file to download an application to the object 110. In another example, the service provider device 130 communicates data from a database to the object 110. Any other requested and authorized data may be communicated to the object 110.

Additionally, any data from the object 110 to the service provider device 130 may be provided. In an example, if an object 110 requests to upload data history, the service provider device 130 receives and stores that data. For example, an application that is requesting a software update may send a communication specifying the version of the software that is currently operating on the object 110. In another example, an application communicates user history of an application to the service provider device 130 for storage. In another example, a communication network device provides updates to the service provider device 130 regarding third party devices that are attempting to connect to the communication network device. Any other suitable communication may be sent from the object 110 to the service provider device 130.

After the communications are completed, the session token and/or the access token may expire. If the object 110 desires future communications, the object 110 may be required to repeat the steps of the method 200 to obtain new tokens to communicate with the service provider device 130.

FIG. 3 is a block flow diagram depicting a method 300 to validate an object identity using a certificate, in accordance with certain examples.

In block 310, a certificate authority 140 communicates a certificate to the object 110. The certificate authority 140 may be, for example, a computing device, a server, a web browser application, a stand-alone application, or other device or service that provides certificates to objects 110 or other computing devices. The certificate authority 140 can interact with web servers or other computing devices connected to the network 99. The certificate authority 140 may be an application or a device associated with the authorization system 120, a financial institution, a third party identity verification system, a mobile device service provider, or any other suitable system. In an example, the certificate authority 140 provides certificates to objects 110 and other computing devices. The certificate authority 140 issues digital certificates that certifies the ownership of a public key in the name of the object 110. The public key allows the service provider device 130 to rely upon assertions made about a private key that corresponds to the certified public key.

In an example, the object 110 is an appliance, an application on a user computing device, a server or other computing device that performs tasks for users without human interaction, a network device that receives and transmits communications to and from other network devices, or any other type of device as described herein with respect to FIG. 2. The objects 110 may be configured to perform tasks as described in block 210 of FIG. 2.

The object 110 may be configured to request a communication with another device, such as the service provider device 130. The communication may request or provide data, an update, a check-in, a status, a location update, or any other suitable communication. The communication may be initiated by the object 110, the service provider device 130, a user, or any other suitable party.

When the object 110 determines that a secure communication with the service provider device 130 is needed or imminent, the object 110 identifies a provided certificate from the certificate authority 140. In an example, the certificate is requested by the object 110 and received at the time of the determination. In another example, the certificate is provided by the certificate authority 140 in anticipation of a future need. The certificate may be provided at the time that the object is first configured, at each request, on a configure schedule, when certain events occur, or at any suitable time. The certificate is stored at any suitable location, such as a data storage unit of the object 110 or in a cloud storage location.

In an example, the object 110 communicates a request to certificate authority 140 for a current certificate for the object 110. In an example, the object 110 provides a username for the object 110 with which the password is associated. For example, the username for the object 110 is "object1." In an example, the certificate authority 140 accesses a database of certificates and selects the current certificate associated with the username of the object 110. In another example, the certificate authority 140 creates a new certificate for the object 110. The certificate authority 140 communicates the certificate to the object 110. The communication may be via any suitable technology, such as an Internet communication over the communications network 99. In certain examples, the communication is encrypted or otherwise protected from outside observation.

In block 320, the object 110 negotiates a mutual security protocol with an authorization server 125 and communicates the certificate to the authorization server 125. The communication may be via any suitable technology, such as an Internet communication over the communications network 99. In certain examples, the communication is encrypted or otherwise protected from outside observation. For example, in certificate-based mutual transport layer security protocol, the system requires the authorization server 125 to be authenticated to the object 110. The authentication of the object 110 to the authorization server 125 is managed by the application layer. The protocol offers the ability for the authorization server 125 to request that the object 110 send the certificate to prove the identity of the object 110. The mutual transport layer security ensures that both parties are authenticated via certificates.

In block 330, the object 110 requests an access token from the authorization server 125 to be used with a service provider device 130. The communication in the example requests that the authorization system 120 creates or provides an access token that is specific to the particular service provider device 130. The access token may be requested that only is effective with the particular service provider device 130 and not any other provider device.

In block 340, the authorization server 125 validates the subject domain name and the issuer domain name of the certificate to establish the object 110 identity via a virtual directory 160. The virtual directory 160 is a device or application that delivers a single access point for identity management applications and service platforms. The virtual director 160 receives queries from the authorization system 120 or others and directs the query to the appropriate data sources by abstracting and virtualizing data. The virtual directory 160 integrates identity data from multiple heterogeneous data stores and presents the data as though it were coming from virtual directory 160. In the examples, the virtual directory 160 validates the credential by comparing the subject domain name and the issuer domain name of the certificate. If a match is found, then the object identity is validated.

In block 350, the authorization server 125 communicates to the object 110 an access token that is associated with a service provider device 130. The authorization server 125 creates or accesses an access token. The access token is associated with the service provider device 130 such that the access token is scoped for the object 110. The authorization server 125 passes the access token as a credential to the object 110 to be provided to the service provider device 130. The passed token informs the service provider device 130 that the bearer of the token has been authorized to access the service provider device 130 and perform specific actions specified by the scope that was granted during authorization.

The configured scope defines the specific functions and protected resources to which the service provider device 130 is allowed. The authorization server 125 scopes the token such that only the required information that is needed is provided to or from the object 110. The authorization server 125 signs the access token with an authorization provider signature to validate the access token to a service provider device 130. The authorization provider signature may be compared by the service provider device 130 to a stored authorization provider signature to verify the authenticity of the access token.

In block 360, the object 110 communicates the access token to the service provider device 130. The communication may be via any suitable technology, such as an Internet communication over the communications network 99. The object 110 provides the scoped access token and a request to provide access to the needed resources. For example, the request may be for a device update, data from a database, access to an application, access to a device, access to a directory, third party information, a communication with a third party, a download, or any other suitable access request. The access token is scoped to allow access to the requested resources, identify the object 110, identify the service provider device 130, or perform any other suitable tasks to support the resource request.

In block 370, the service provider device 130 validates the access token with the authorization server 125 signature. The service provider device 130, after receiving the access token and the request verifies that that authorization provider signature associated with the access token is valid. The authorization provider signature may be compared by the service provider device 130 to a stored authorization provider signature to verify the authenticity of the access token. If the authorization provider signature is verified, then the service provider device 130 determines that the access token is authentic and access may be granted to the object 110.

In block 380, the service provider device 130 optionally communicates a session token to the object 110. Depending on the implementation of the service provider device 130, a session token may be communicated to the object 110 to identify the session and allow the service provider device 130 to access the session and all user information available for the session. The session token, also known as a sessionID, is an encrypted, unique string that identifies the specific session instance. The session token may be provided in a cookie or in any other suitable communication.

In block 390, the object 110 accesses resources from the service provider device 130. The object 110 requests the needed information or data from the service provider device 130. If the session token, access token, or other instructions provide authorization for the service provider device 130 to allow access to the requested data, then the service provider device 130 communicates the data to the object 110. For example, if the object 110 is an appliance that requires a software update, the object 110 and the service provider device 130 will negotiate to identify the correct version of the software update needed. The service provider device 130 verifies that the authority to provide the software update is provided. The service provider device 130 communicates the software update to the object 110. In another example, the service provider device 130 communicates a file to download an application to the object 110. In another example, the service provider device 130 communicates data from a database to the object 110. Any other requested and authorized data may be communicated to the object 110.

Additionally, any data from the object 110 to the service provider device 130 may be provided. In an example, if an object 110 requests to upload data history, the service provider device 130 receives and stores that data. For example, an application that is requesting a software update may send a communication specifying the version of the software that is currently operating on the object 110. In another example, an application communicates user history of an application to allow the service provider device 130 for storage. In another example, a communication network device provides updates to the service provider device 130 regarding third party devices that are attempting to connect to the communication network device. Any other suitable communication may be sent from the object 110 to the service provider device 130.

After the communications are completed, the session token and/or the access token may expire. If the object 110 desires future communications, the object 110 may be required to repeat the steps of the method 300 to obtain new tokens to communicate with the service provider device 130.

While examples provided herein are directed to using passwords and certificates to authenticate the objects 110, other systems may also be used. For example, an alternative to certificates that uses a proprietary authentication system may be used to validate the identity of the object 110 to the authentication server 125.

Example Systems

FIG. 4 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, Fire Wire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device, for example, a system on chip (SOC), system on package (SOP), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Additionally, any reference to an act being performed by a computer should not be construed as being performed by a single computer as more than one computer may perform the act.

The examples described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The systems, methods, and acts described in the examples presented previously are illustrative, and, in alternative examples, certain acts can be performed in a different order, in parallel with one another, omitted entirely, and/or combined between different example examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A system, comprising:

a storage device; and one or more processors communicatively coupled to the storage device, wherein the one or more processors execute application code instructions that are stored in the storage device to cause the system to:

receive, from a service provider device, a request for updating software for an object operating independently from a human;

retrieve, from a remote system comprising a password vault, a machine-generated password previously linked to the one or more processors of a human-independent machine, wherein the machine-generated password is used to authenticate the object operating independently from a human when receiving a software update for the object operating independently from a human;

communicate the machine-generated password to an authorization server;

receive an access token from the authorization server;

transmit, to the service provider device, a second request for data for the software update from the service provider device;

communicate the access token to the service provider device; and receive the data for the software update based on the access token being valid.

2. The system of claim 1, wherein the authorization server validates the machine-generated password by fetching an encrypted password for the one or more processors from a virtual directory.

3. The system of claim 1, wherein the application code instructions further cause the one or more processors to request the machine-generated password for the system from the password vault.

4. The system of claim 1, wherein the application code instructions further cause the one or more processors to receive a session token from the service provider device.

5. The system of claim 1, wherein the service provider device communicates a session token to the one or more processors upon receipt of the access token.

6. The system of claim 1, wherein the system is an appliance.

7. The system of claim 1, wherein the system comprises an application operating on a computing device.

8. The system of claim 1, wherein the data is an update to software operating on the one or more processors.

9. The system of claim 1, wherein the data is retrieved by the service provider device from a database.

10. The system of claim 1, wherein the service provider device validates the access token received from the one or more processors by comparing the access token to an authorization server signature.

11. A method, comprising:

receive, from a service provider device, a request for updating software for an object operating independently from a human;

transmitting, from a computing device operating independently from a human to a remote server comprising a certificate authority, a certificate request for a previously generated certificate that corresponds to the computing device;

receiving, by the computing device the previously generated certificate, wherein the previously generated certificate is used to authenticate the object operating independently from a human when receiving a software update for the object operating independently from a human;

communicating, by the computing device, the previously generated certificate to an authorization server;

receiving, by the computing device, an access token from the authorization server;

transmitting, to the service provider device, a second request for data for the software update from the service provider device;

communicating, by the computing device, the access token to the service provider device; and receiving, by the computing device, the data for the software update based on the access token being valid.

12. The method of claim 11, further comprising validating, by the authorization server, a subject domain name received from the computing device and an issuer domain name of the previously generated certificate to establish an identity via a virtual directory.

13. The method of claim 11, further comprising negotiating, by the computing device and the authorization server, a mutual security protocol.

14. The method of claim 11, further comprising receiving, by the computing device, a session token from the service provider device.

15. The method of claim 11, wherein the service provider device validates the access token received from the computing device by comparing the access token to an authorization server signature.

16. A method, comprising:

receive, from a service provider device, a request for updating software for an object operating independently from a human;

receiving, by a computing device operating independently from a human from a remote credential vault, a credential corresponding to an application on the computing device, wherein the credential corresponding to the application has been previously linked to the application;

communicating, by the computing device, the credential corresponding to the application to an authorization server, wherein the credential is used to authenticate the object operating independently from a human when receiving a software update for the object operating independently from a human;

receiving, by the computing device, an access token from the authorization server;

transmitting, to the service provider device, a second request for data for the software update from the service provider device;

communicating, by the computing device, the access token to the service provider device; and receiving, by the computing device, the data for the software update based on the access token being valid.

17. The method of claim 16, wherein the credential is a username and password.

18. The method of claim 16, wherein the credential is a certificate from a certificate authority.

19. The method of claim 16, wherein the authorization server verifies the credential with a virtual directory.

20. The method of claim 16, wherein the service provider device validates the access token received from the computing device by comparing the access token to an authorization server signature.

* * * * *